(12) United States Patent
Starke

(10) Patent No.: US 10,814,701 B2
(45) Date of Patent: Oct. 27, 2020

(54) SYSTEM AND METHOD FOR OPERATING AN HVAC SYSTEM OF A VEHICLE INCLUDING AN OLFACTORY SIGNAL

(71) Applicant: Ford Global Technologies, LLC, Dearborn, MI (US)

(72) Inventor: Carsten Starke, Vaals (NL)

(73) Assignee: Ford Global Technologies, LLC, Dearborn, MI (US)

( * ) Notice: Subject to any disclaimer, the term of this patent is extended or adjusted under 35 U.S.C. 154(b) by 11 days.

(21) Appl. No.: 15/630,008

(22) Filed: Jun. 22, 2017

(65) Prior Publication Data

US 2017/0368915 A1    Dec. 28, 2017

(30) Foreign Application Priority Data

Jun. 27, 2016   (DE) .................. 10 2016 211 491

(51) Int. Cl.
*B60H 3/00*    (2006.01)

(52) U.S. Cl.
CPC .................. *B60H 3/0035* (2013.01)

(58) Field of Classification Search
CPC ...... B60H 3/0035; B65D 2203/12; A61L 2/24
USPC .......................................................... 454/156
See application file for complete search history.

(56) References Cited

U.S. PATENT DOCUMENTS

| | | | | |
|---|---|---|---|---|
| 4,370,300 A * | 1/1983 | Mori | ................. | A61L 2/24 |
| | | | | 261/102 |
| 5,071,621 A * | 12/1991 | Tokuhiro | ................. | A61L 9/12 |
| | | | | 180/271 |
| 5,105,133 A * | 4/1992 | Yang | ................. | A61L 9/122 |
| | | | | 261/DIG. 88 |
| 5,115,975 A * | 5/1992 | Shilling | ................. | A61L 9/03 |
| | | | | 239/136 |
| 5,175,791 A * | 12/1992 | Muderlak | ................. | A61L 9/03 |
| | | | | 219/492 |
| 8,448,739 B2 * | 5/2013 | Kolich | ................. | A61L 9/125 |
| | | | | 180/271 |
| 8,492,683 B2 * | 7/2013 | Challita | ................. | H05B 6/105 |
| | | | | 219/618 |

(Continued)

FOREIGN PATENT DOCUMENTS

| | | | | |
|---|---|---|---|---|
| DE | 10044894 A1 * | 3/2002 | ......... | B60H 3/0007 |
| DE | 10044894 B4 | 3/2002 | | |

(Continued)

OTHER PUBLICATIONS

Grommer et al., WO 2004/037304 A1 English machine translation, May 6, 2004.*

(Continued)

*Primary Examiner* — Edelmira Bosques
*Assistant Examiner* — Phillip Decker
(74) *Attorney, Agent, or Firm* — David Coppiellie; Price Heneveld LLP

(57) ABSTRACT

In a method for operating a heating, ventilation, and air conditioning (HVAC) system of a vehicle, an input of an instruction of a user for the HVAC system is performed by means of a user interface. The HVAC system executes the input instruction. Furthermore, an olfactory signal is generated for the user by means of an olfactory device of the HVAC system as an input confirmation. Furthermore, a corresponding HVAC system for a vehicle is provided.

17 Claims, 2 Drawing Sheets

(56) References Cited

U.S. PATENT DOCUMENTS

| | | | | |
|---|---|---|---|---|
| 8,632,059 B2* | 1/2014 | Pankhurst | ................ | A61L 9/02 |
| | | | | 261/131 |
| 9,259,750 B2* | 2/2016 | Johnson | ................... | A61L 9/127 |
| 2008/0153408 A1* | 6/2008 | Thomas | ..................... | A61L 9/14 |
| | | | | 454/156 |
| 2008/0188172 A1* | 8/2008 | Hollemans | ......... | B60H 1/00742 |
| | | | | 454/75 |
| 2009/0104072 A1* | 4/2009 | Ando | ....................... | A61L 9/04 |
| | | | | 422/5 |
| 2009/0252855 A1* | 10/2009 | Ewald | ..................... | A23L 15/00 |
| | | | | 426/614 |
| 2011/0082602 A1* | 4/2011 | Tanaka | ..................... | F24F 11/30 |
| | | | | 700/300 |
| 2011/0089255 A1* | 4/2011 | Kolich | .................... | A61L 9/125 |
| | | | | 239/34 |
| 2012/0107172 A1* | 5/2012 | Ono | ..................... | B60H 3/0035 |
| | | | | 422/4 |
| 2012/0264361 A1* | 10/2012 | Scheer | ................. | B60H 3/0035 |
| | | | | 454/75 |
| 2015/0098860 A1* | 4/2015 | Aldereguia | ............... | A61L 9/01 |
| | | | | 422/3 |
| 2015/0142237 A1* | 5/2015 | Wu | ........................... | B60L 1/02 |
| | | | | 701/22 |
| 2016/0112526 A1* | 4/2016 | Jeong | ...................... | H04L 67/26 |
| | | | | 709/204 |
| 2016/0306424 A1* | 10/2016 | Vanhelle | ................... | G06F 3/01 |
| 2017/0092269 A1* | 3/2017 | Haubrich | ................ | G10L 15/22 |
| 2017/0228126 A1* | 8/2017 | Kim | | |
| 2018/0196501 A1* | 7/2018 | Trotta | .................... | B60R 25/245 |

FOREIGN PATENT DOCUMENTS

| | | | | | |
|---|---|---|---|---|---|
| DE | 10134223 | A1 | * | 1/2003 | ........... B60H 3/0007 |
| DE | 10134223 | A1 | | 1/2003 | |
| DE | 102012021448 | A1 | * | 5/2013 | ................ A61L 9/12 |
| DE | 102014113622 | A1 | * | 3/2016 | ................ F24F 3/14 |
| DE | 102014113622 | A1 | | 3/2016 | |
| EP | 0483848 | A2 | * | 5/1992 | ........... B60H 3/0035 |
| EP | 0483848 | A2 | | 5/1992 | |
| FR | 2867424 | A1 | * | 9/2005 | ................ A61L 9/12 |
| FR | 2942747 | A1 | * | 9/2010 | ........... B60H 3/0035 |
| JP | H02102810 | U | | 8/1990 | |
| JP | 2013203354 | A | * | 10/2013 | |
| JP | 2013203356 | A | * | 10/2013 | |
| WO | WO 2004037304 | A1 | * | 5/2004 | ............. A61L 9/035 |

OTHER PUBLICATIONS

Metz, et al., DE 102014113622 A1 English machine translation, Mar. 24, 2016. (Year: 2016).*

* cited by examiner

SYSTEM AND METHOD FOR OPERATING AN HVAC SYSTEM OF A VEHICLE INCLUDING AN OLFACTORY SIGNAL

FIELD OF THE INVENTION

The present invention generally relates to a method for operating a heating, ventilation, and air conditioning system of a vehicle, and also to a heating, ventilation, and air conditioning system for a vehicle.

BACKGROUND OF THE INVENTION

A heating, ventilation, and air conditioning (HVAC) system for vehicles, in particular for motor vehicles, typically comprises a blower and air ducts for introducing air flows into a passenger compartment of the vehicle. In a typical HVAC system, a temperature control of the air flow to an internal temperature of the vehicle desired by a user is performed generally using a heater and a cooling device. An allocation of the air flow generated by the blower for various regions of the passenger compartment is implemented via an air flow distribution device typically having multiple outlet openings.

Furthermore, HVAC systems having an olfactory air improvement are known. For example, EP 483 848 discloses an HVAC system having a fragrance supply device. The fragrance supply device has multiple fragrance cassettes, which each contain different, volatile fragrances. A supply of air typically occurs through a pipe provided with a solenoid valve, the inlet opening of which is arranged in the air flow direction after a blower of the HVAC system. The branched-off air flow is allocated onto the fragrance cassettes and is brought together again after them via pipes. A solenoid valve is in turn provided for each pipe. Finally, the air enriched with fragrances is introduced into an air duct of the HVAC system and enters the passenger compartment of the vehicle through outlet openings. A control of the solenoid valves is performed by means of a fragrance controller.

A further air refreshment device is described in DE 101 34 223 A1 which, independently of an HVAC system, enables an individual region-related olfactory modification of the air in the vehicle interior. For this purpose, the air refreshment device contains a blower for each region, each of which suctions air out of the passenger compartment and conducts it past controllable outlet openings of multiple olfactory devices into the respective region of the passenger compartment. Each olfactory device contains a container for an olfactory active substance. An electronic control unit of the air refreshment device controls the blowers and the outlet openings of the olfactory devices such that a desired modification of the through-flowing air occurs for each region. A modification of the air by means of the air refreshment device is performed according to an input of the user. Furthermore, it can be provided that an olfactory modification of the air is to be triggered as a warning signal for the driver in certain critical vehicle states, such as, for example, a high coolant or oil temperature, an imminent under voltage of a power supply, a low pressure in a tire, an ABS failure, and the like.

Known HVAC systems typically comprise a user interface having pushbuttons and rotating knobs as operating elements. Using the operating elements, a user can activate, deactivate, or modify various functions of the HVAC system. For example, the user interface enables the user, using the operating elements, to input an instruction to the HVAC system with respect to a desired blower speed, internal temperature, or air flow distribution for various regions of a passenger compartment. Further possible instructions of the user are, for example, activation or deactivation of an automatic control of the HVAC system or the entire HVAC system, settings for an auxiliary heater or seat heater, or the like. Increasingly, instead of pushbuttons or rotating knobs, a touchscreen as a user interface employed jointly with other systems of the vehicle or instead of a manual input, also an oral input by spoken instructions of the user are also taken into consideration.

An input confirmation for a user upon an input of an instruction via pushbuttons or rotating knobs often only occurs haptically or visually by means of a present setting of the respective button or knob. For this purpose, the user has to look away from the roadway or remove a hand from the steering wheel. Additionally provided visual feedback by means of corresponding display elements is typically likewise not located in the field of vision of a driver concentrating on the roadway. An additional acoustic input confirmation often only occurs immediately after an input and can easily be missed in the event of a high level of internal or external noise.

Because many function modifications in an HVAC system, for example a modification of an internal temperature, do not occur immediately, uncertainty of the user can rapidly arise as to whether the HVAC system is actually executing the user instruction. Therefore, increased visual or haptic monitoring of the user interface of the HVAC system by the user can occur, wherein the user turns the user's attention away from the traffic conditions. The user interface, which may be user-unfriendly due to these factors, can result in a negative user experience upon use of the HVAC system and inattentiveness in road traffic.

It would be desirable to provide for a method for operating a heating, ventilation, and air conditioning system of a vehicle, and a heating, ventilation, and air conditioning system for a vehicle, wherein the above-mentioned disadvantages are avoided or at least reduced and user-friendly operation is achieved.

SUMMARY OF THE INVENTION

According to one aspect of the present invention, a method for operating a heating, ventilation, and air conditioning (HVAC) system of a vehicle is provided. The method includes the steps of performing an input instruction of a user for the HVAC system with a user interface, executing the input instruction with the HVAC system, and generating an olfactory signal for the user with an olfactory device of the heating, ventilation, and air conditioning system as an input confirmation.

According to another aspect of the present invention, a heating, ventilation, and air conditioning (HVAC) system for a vehicle is provided. The system includes a user interface for receiving an input instruction for the HVAC system by a user, a control device for executing the input instruction, and an olfactory device for generating an olfactory signal for the user as an input confirmation of the instruction input by the user.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
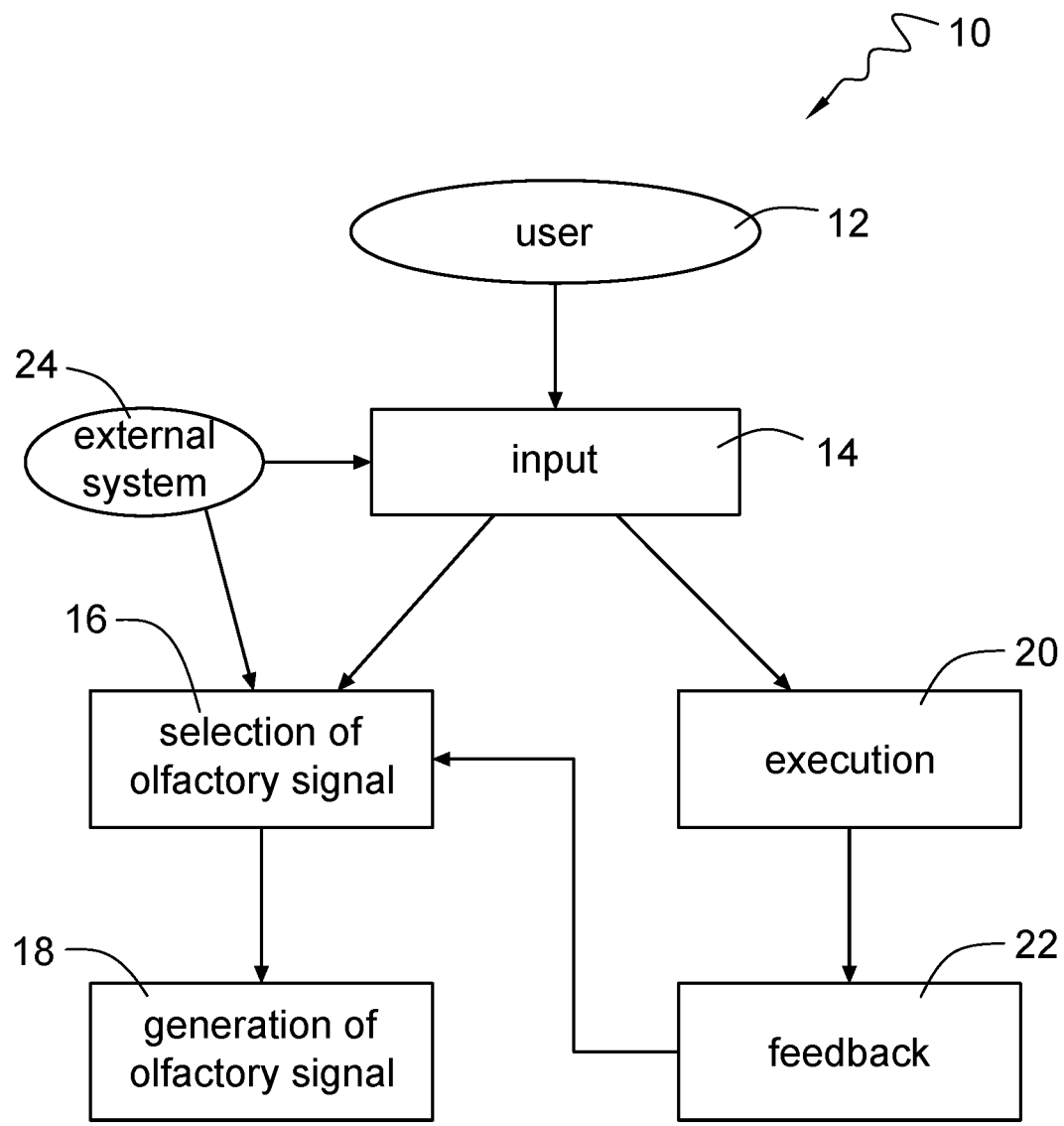
FIG. 1 is a simplified, schematic flow chart illustrating an exemplary embodiment of a method for operating an HVAC system.

FIG. 1 schematically shows an exemplary embodiment of a method 10 for operating an HVAC system of a vehicle. Firstly, a user 12 inputs an instruction at the HVAC system. In this exemplary embodiment, the user 12 carries out this input 14 via a user interface having a manually operable central operating device of the HVAC system. For this purpose, the operating device comprises, as operating elements, one or more rotating knobs, pushbuttons, keys, or an arbitrary combination of these operating elements. Alternatively or additionally, softkeys or a touchscreen can also be provided for the input of instructions. Other embodiments comprise, additionally or alternatively to the manually operable operating device, a speech recognition system for an input of spoken instructions or a gesture recognition system for gesticulated instructions.

Instructions input via the user interface relate in general to an activation, modification, or deactivation of a function of the HVAC system. Examples of an instruction are turning the HVAC system on or off, activation or deactivation of an automatic controller, or a setting of a blower speed, an internal temperature of a passenger compartment, an allocation of air flows into various regions of the passenger compartment or the vehicle cell, an auxiliary heater, a seat heater, or further functions of an HVAC system known to a person skilled in the art.

The user interface interprets an input 14 of the user and relays corresponding control signals to a confirmation device for an input confirmation and to a control device for executing the instruction. Alternatively, a relay to the confirmation device via the control device or an integration of the confirmation device into the control device is also possible. The confirmation device uses the received control signals for the selection 16 of an olfactory signal as an input confirmation for the user. In addition to an odor as an olfactory signal, a selection 16 of an acoustic, visual, or tactile signal can be performed in this case as an input confirmation.

A selection 16 is performed on the basis of the input instruction and/or the corresponding control signals, for example from a list or table of instructions and associated olfactory, visual, acoustic, or tactile signals. Such a predefined association is preferably stored in a memory of the confirmation device. A modification of the association or of associated signals can be carried out by the user 12 via the user interface. In one exemplary embodiment, an individual association of olfactory and differently formed signals to instructions is used for each of various users. This can be performed by means of provided user profiles of the HVAC system.

Subsequently, a generation 18 of a selected odor as the olfactory signal is performed by the confirmation device with the aid of an olfactory device. The olfactory device contains multiple containers for olfactory substances, which emit a settable quantity per unit of time of olfactory substances to an air flow of the HVAC system. Together with the air flow, the olfactory substances enter the passenger compartment of the vehicle and can be perceived in an olfactory manner by a user.

Metering of the emitted quantity per unit of time or air volume takes place in this case via settable outlet openings of the container. Alternatively or additionally, a variable heater can be provided for a metered emission of olfactory substances. Using such metering, the type, intensity, and duration of the olfactory signal during the generation 18 can be specified. A selected olfactory signal is generated by the olfactory device on the basis of values, which are likewise stored, for an emission quantity per unit of time or air volume, a concentration in the air, control commands for the olfactory device, or the like. The emission of olfactory substances from one or more containers occurs into one or more air ducts of the HVAC system, which preferably introduce air flows into a head or upper body region of the passenger compartment.

The type of odor of an olfactory signal for an input confirmation of an instruction is predefined and stored as an association such that the odor is in general associated by a user with the instruction. Thus, for an instruction for cooling or ventilation of the passenger compartment air, an aroma typically associated with freshness, such as an aroma of mint or the ocean, is provided. For an instruction for heating the passenger compartment, in contrast, an odor associated with heat is used as the input confirmation. For this purpose, for example, an odor of an open fire, Christmas cookies, or the like can be provided.

Furthermore, the intensity of one or more olfactory signals is predefined such that the generated odor is below a recognition threshold or below a perception threshold. A user can no longer associate an odor below a recognition threshold. The user only perceives that he smells something. The user no longer consciously perceives odors below a perception threshold, but rather perceives them unconsciously. With such a predefined intensity, the user feels that his instruction was confirmed, without attributing this directly to a generated odor.

The duration of an olfactory signal is in particular predefined such it acts on the user sufficiently long for an input confirmation, on the one hand, and is not perceived as annoying, on the other hand. Depending on the type and intensity, the duration can be set differently for various olfactory signals. For example, an emission of olfactory substances is designed such that the duration of the signal is between several seconds and several minutes. Because odors are often differently perceived individually, a setting of the type, intensity, and duration of olfactory signals individually for a user is possible.

In the case of the selection 16, in addition to an olfactory signal for predetermined instructions, an acoustic, optical, or tactile signal or an arbitrary combination of these signals can additionally also be selected and subsequently generated 18 together with the olfactory signal. Additional signals can also be stored as an association with certain instructions in a memory. A signal is preferably additionally generated, which triggers a similar association as the olfactory signal in the user. Thus, a noise, a sound, or a melody can be generated as an acoustic signal together with the olfactory signal, which is also perceived as fresh like the olfactory signal, for example. Accordingly, optical signals can be generated by means of one or more lighting elements or a display screen as a certain illumination, light sequence, or also images or videos. Furthermore, tactile signals can be generated, for example on the steering wheel, at the seat, or at a manual operating element. Not only the sense of smell, but also other senses of the user are used for an input confirmation by such a combination and an overall impression is therefore generated.

Simultaneously with the selection 16 or generation 18 of the olfactory signal or only after a generation 18, an execution 20 of an input instruction is performed by the control device on the basis of the control signals received from the user interface. For this purpose, the control device controls various components of the HVAC system in accordance with the instruction. As components, the HVAC system comprises, for example, a blower for generating an air flow, a heating or cooling device for temperature control of the generated air flow, a distribution device for distributing and introducing the air flow into various regions of the passenger compartment, and other devices known to a person skilled in the art. Furthermore, the HVAC system comprises various sensors, such as temperature sensors, light sensors for incident sunshine, moisture sensors for an ambient humidity, a timer, and the like. Values acquired by the sensors may be taken into consideration during the execution of an instruction.

Furthermore, during an execution 20 in the event of predefined states of the HVAC system or immediately after a successful execution of certain instructions, the control device generates a feedback 22. A feedback 20 can also be performed in the case of predefined states or state changes of the HVAC system, for example upon an automatic activation, deactivation, or modification of a function of the HVAC system. The feedback 22 is also used by the confirmation device, similarly to the above-described method steps, upon an input confirmation for the selection 16 and generation 18 of an olfactory signal. In this case, in particular additional acoustic, visual, or tactile signals can also be selected and generated, which are associated together with the olfactory signal with the respective feedback in a memory. For example, reaching a desired state, such as a certain internal temperature or a performed air exchange, is thus communicated in an olfactory manner to a user.

Furthermore, according to this exemplary embodiment, an interface is provided for receiving instructions from external systems 24, for example from other systems of the vehicle or via a wireless network, for example mobile wireless or WLAN, from external devices, for the HVAC system. A selection 16 and a generation 18 of an olfactory signal as an input confirmation are also provided for certain instructions of an external system 24. For example, upon an activation of an auxiliary heater by means of a mobile wireless terminal via a mobile wireless network and the Internet, an olfactory signal can be generated, which the user perceives upon entering the vehicle.

Furthermore, direct instructions to the confirmation device for the selection 16 and generation 18 of an olfactory signal are possible via the interface for external systems 24. In addition, visual, acoustic, or tactile signals can also be generated. In this manner, on the one hand, an olfactory input confirmation for an input at the external system 24, for example an instruction to a navigation system or an entertainment system having a radio, television, CD player, or DVD player, can be performed. On the other hand, an olfactory signal can also be carried out as a status report to the user for predefined states of the external system 24, such as reaching a desired state.

Figure 2:
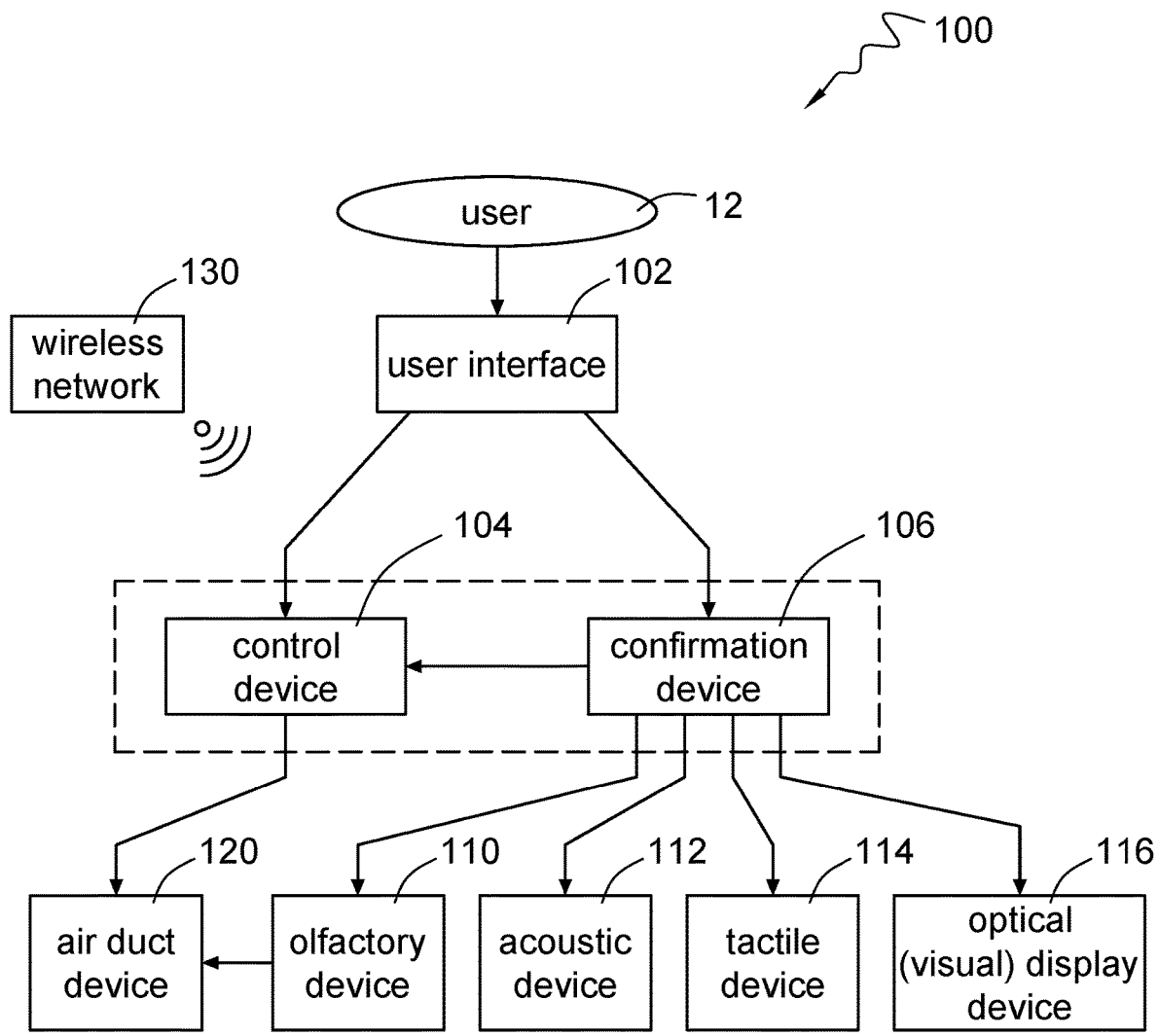
FIG. 2 is a block diagram of the HVAC system, according to one embodiment.

The HVAC system 100 for a vehicle may be implemented using the devices shown in FIG. 2, according to one embodiment. In this embodiment, the HVAC system 100 includes a user interface 102 that receives an input instruction for the HVAC system by a user 12. The HVAC system 100 also includes a control device 104 that receives the input instruction from the user interface 102 and executes the input instruction. The HVAC system 100 in the embodiment shown, includes a confirmation device 106 which is shown as a device separate from the control device 104. However, it should be appreciated that the confirmation device 106 may be integrated with the control device 104, according to another embodiment. The confirmation device provides a confirmation command to one or more devices including an olfactory device 110 for generating an olfactory signal for the user as an input confirmation of the instruction input by the user. The olfactory device 110 generates an olfactory signal in the form of an odor which may be passed into an HVAC device such as at least one air duct devices 120. In addition, the confirmation device 106 may also generate a signal to one or more of an acoustic device 112, a tactile device 114, and an optical (visual) display device 116. It should be appreciated that the control device 104 may further control the HVAC air duct device 120. Further, a wireless network 130 may be included for communicating signals wirelessly, or alternatively a wired system may be in place to provide hard wired connection between the devices and with one or more external systems. It should be appreciated that other hardware arrangements may be employed for implementing the HVAC system and method, according to other embodiments.

The method for operating an HVAC system of a vehicle has an input of an instruction of a user for the heating, ventilation, and air conditioning system is performed by means of a user interface. The method is designed in particular for motor vehicles. The user interface preferably comprises a manually operable central operating device for the HVAC system, which is arranged within reach of the driver, for example on the dashboard or a central console of the vehicle. The operating device contains, for example, rotating knobs, pushbuttons, buttons, softkeys, or a touchscreen for the input of instructions by the user. Alternatively or additionally, a speech recognition system for spoken instructions or a gesture recognition system for gestures executed by the user can be provided. Instructions input via the user interface comprise in particular an activation, change, or deactivation of functions of the HVAC system. For example, using corresponding instructions, the HVAC system or an automatic controller of the HVAC system may be turned on or off, or a blower speed, an allocation of air flows into various regions of the passenger compartment, an internal temperature, a seat heater, an auxiliary heater, and the like may be set.

Furthermore, the heating, ventilation, and air conditioning system executes the input instruction. For this purpose, the HVAC system comprises, for example, a control device, which controls various components of the HVAC system, for example a blower for generating an air flow, a heating or cooling device for temperature control of the generated air flow, and a distribution device for distributing and introducing the air flow into various regions of the vehicle passenger compartment in accordance with the instruction. In this case, values of various sensors, for example temperature sensors for an external or internal temperature, light sensors for incident sunlight, moisture sensors for an ambient humidity, a timer, and the like are preferably taken into consideration by the control device. Furthermore, an interface for receiving instructions or ambient values from other systems of the vehicle or via a wireless network, for example mobile wireless or WLAN, from external devices can be provided for the control device.

As an input confirmation, an olfactory signal is generated for the user by means of an olfactory device of the heating, ventilation, and air conditioning system. The olfactory device preferably has one or more containers for olfactory substances, which are emitted in an adjustable quantity per unit of time to the passenger compartment. For example, outlet openings or a heater of the container are controllable by means of the control device such predefined olfactory signals are generated as an input confirmation for certain instructions. An olfactory signal can therefore represent a certain odor, which is composed of one or more olfactory substances and is preferably released immediately after an input of an instruction as an input confirmation for a limited period of time.

In other words, the method of generating an olfactory input confirmation is performed for a user upon an operation of an HVAC system. The user can perceive this olfactory signal immediately after an input, without turning his attention away from the traffic conditions. A very user-friendly confirmation of performed settings on the HVAC system is therefore performed for a user.

According to one embodiment, at least one air duct of the heating, ventilation, and air conditioning system is used to generate the olfactory signal. The olfactory device preferably generates the olfactory signal in an air flow of an air duct for an upper body or head region of the passenger compartment. Alternatively, a generation of the olfactory signal can also be performed in the air flow direction immediately after or also before a blower and a distribution to the passenger compartment can be performed by a distribution device having air ducts. By using an air duct of the HVAC system, generation of olfactory signals or odors can be implemented in an uncomplicated and cost-effective manner by means of an appropriately arranged olfactory device.

The olfactory device of an advantageous embodiment generates an odor which has a tendency to be associated by the user with the input instruction as an olfactory signal. For example, in the event of an instruction for cooling or ventilation of the vehicle passenger compartment air, an odor typically associated with cold or freshness is generated as the olfactory signal, for example an odor of mint or the ocean. In the event of an instruction to heat the passenger compartment air, on the other hand, an odor generally associated with heat is generated, such as an odor of an open fire, Christmas cookies, or the like. In the event of a generation of such olfactory signals, in each case a predefined quantity of olfactory substances per unit of air volume and unit of time is released by means of the olfactory device. Because individuals can interpret or associate odors differently, according to a further embodiment, an individual setting of olfactory signals with respect to type, intensity, duration, or a combination of these parameters is provided for a user.

In a further advantageous embodiment, the olfactory device generates an odor, which has a tendency to be below a threshold of a conscious perception by the user, as an olfactory signal. In this case, this can be a recognition threshold, from which a user can unambiguously assign an odor, or a perception threshold, above which the user consciously smells anything at all. In the case of an olfactory signal below a perception threshold, a concentration of olfactory substances in the air is set such that a user only unconsciously perceives an odor. If the quantity of olfactory substances in the air is between a perception threshold and a recognition threshold, the user thus smells something, but cannot recognize what he smells. An annoyance of the user due to excessively intensive odors is avoided by this procedure. The user feels that his instruction was understood, without attributing this directly to a generated odor.

Preferably, according to one embodiment, in addition to the olfactory signal, an optical, acoustic, or tactile signal is generated as an input confirmation for the user. For example, a signal is additionally generated which triggers a similar association as the olfactory signal in the user. For this purpose, for each olfactory signal, a certain artificial or natural sound, a tone sequence, or a noise can be provided as an acoustic signal and can be generated together with the odor. In the case of an odor of freshness, for example, a sound perceived as freshness is generated. Accordingly, optical signals can be generated by means of one or more lighting elements, for example a display screen, or tactile signals can be generated on the steering wheel, seat, or a manual operating element. In this way, not only the sense of smell, but also other senses of the user are used for an input confirmation and therefore an overall impression is generated.

According to a further embodiment, a certain present state of the HVAC system triggers an olfactory signal for a user. In addition to an input confirmation for an instruction, a predetermined present state of the HVAC system, for example an automatic activation, deactivation, or modification of a function of the HVAC system, in particular one of the above-described functions, an achievement of a desired state, such as a predefined internal temperature, an air exchange, or the like is therefore also reported to the user as an olfactory signal. Such reports are also only perceptible to the user, without distracting his attention from the traffic conditions.

A heating, ventilation, and air conditioning system according to one embodiment for a vehicle comprises a user interface for the input of an instruction for the heating, ventilation, and air conditioning system by a user and a control device for executing the input instruction. Furthermore, an olfactory device is provided for generating an olfactory signal for the user as an input confirmation of an instruction input by the user.

The user interface, the control device, and the olfactory device are designed, for example, as described above in the case of the method. In particular, the user interface can comprise a manually operable central operating device, a speech recognition system, a gesture recognition system, or a combination of these components for the input of instructions by the user, and the olfactory device can contain one or more containers for olfactory substances for generating a chronologically limited olfactory signal as the input confirmation.

Similarly to the method, using the HVAC system according to one embodiment, an olfactory input confirmation is generated upon an operation by a user. The user can immediately perceive this olfactory confirmation in a very user-friendly manner, while he concentrates on the present traffic situation. In particular, the HVAC system is designed to execute one of the above-described methods. Further embodiments of the HVAC system for a vehicle each correspond to describe embodiments of the method for operating an HVAC system and have corresponding features and advantages.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for operating a heating, ventilation, and air conditioning (HVAC) system of a vehicle, comprising:
    setting a quantity and type of an olfactory substance to be emitted based on an HVAC function to be performed;
    performing an input instruction for the HVAC system with a user interface;
    executing the input instruction with the HVAC system;
    generating an olfactory signal with an olfactory device of the HVAC system as an input confirmation;
    generating the olfactory signal with the olfactory device as confirmation of an automatic activation and an automatic deactivation of a function of the HVAC system; and
    adjusting a duration and an intensity of the olfactory signal in response to internal and external temperatures, incident sunshine, and ambient humidity.

2. The method as claimed in claim 1, wherein at least one air duct of the HVAC system is used to generate the olfactory signal.

3. The method as claimed in claim 1, wherein the olfactory device generates an odor based on the input instruction as the olfactory signal associated with the input instruction.

4. The method as claimed in claim 1, wherein the olfactory device generates an odor, which is below a predetermined threshold of a conscious perception by a user, as the olfactory signal.

5. The method as claimed in claim 1, wherein, in addition to the olfactory signal, at least one of an optical, acoustic, and tactile signal is generated as an input confirmation for the user.

6. The method as claimed in claim 1, wherein a certain present state of the HVAC system triggers the olfactory signal for a user.

7. A heating, ventilation, and air conditioning (HVAC) system for a vehicle, comprising:
    a user interface for receiving input instructions for the HVAC system;
    a control device for executing the input instructions; and
    an olfactory device configured to emit a plurality of olfactory signals, wherein the plurality of olfactory signals includes a first olfactory signal configured to be emitted as an input confirmation that corresponds to each of the input instructions and a second olfactory signal configured to be emitted upon completed execution of a function of the HVAC system, wherein each of the first and second olfactory signals is emitted in a preset quantity per unit of time and is a predetermined odor based on at least one of the input instruction by a user and a predefined state of the HVAC system, and wherein a duration is different for each of the first and second olfactory signals.

8. The system as claimed in claim 7, further comprising:
    at least one air duct of the HVAC system which is used to generate the plurality of olfactory signals.

9. The system as claimed in claim 7, wherein the olfactory device is configured to emit an odor as the first olfactory signal indicative of the input instruction designated by the user and the second olfactory signal indicative the completed execution of the function of the HVAC system.

10. The system as claimed in claim 7, wherein the olfactory device generates an odor, which is below a designated threshold of a conscious perception by the user, as the first olfactory signal representative of the input instruction.

11. The system as claimed in claim 7, wherein, in addition to the plurality of olfactory signals, at least one of an optical, acoustic, and tactile signal is generated as an input confirmation for the user.

12. The system as claimed in claim 7, wherein the olfactory device is configured to emit a third olfactory signal in response to a certain present state of the HVAC system.

13. A heating, ventilation, and air conditioning (HVAC) system for a vehicle, comprising:
    a user interface for receiving an input instruction for the HVAC system;
    a control device for executing the input instruction based on a predetermined user profile; and
    an olfactory device configured to emit an olfactory signal, wherein the olfactory signal is configured to be emitted in response to each of the input instruction, a status of an external vehicle system, and an activation, deactivation, and or modification of the HVAC system, wherein a feedback olfactory signal is configured to be emitted upon execution of a function of the HVAC system, wherein the olfactory device includes settable outlet openings for metering a quantity of olfactory substances emitted as the olfactory signal and the feedback olfactory signal.

14. The system as claimed in claim 13, wherein a type, a duration, and an intensity of the olfactory signal are individualized to a user based on the user profile.

15. The system as claimed in claim 13, wherein the olfactory device is configured to emit an odor as the olfactory signal in response to a predefined event of the HVAC system.

16. The system as claimed in claim 13, wherein the olfactory signal includes a first odor indicative of the input instruction for air conditioning and a second odor indicative of the input instruction for heat.

17. The system as claimed in claim 13, wherein the olfactory device is configured to emit the olfactory signal in response to a predetermined desired state of the HVAC system.

* * * * *